Patented July 1, 1930

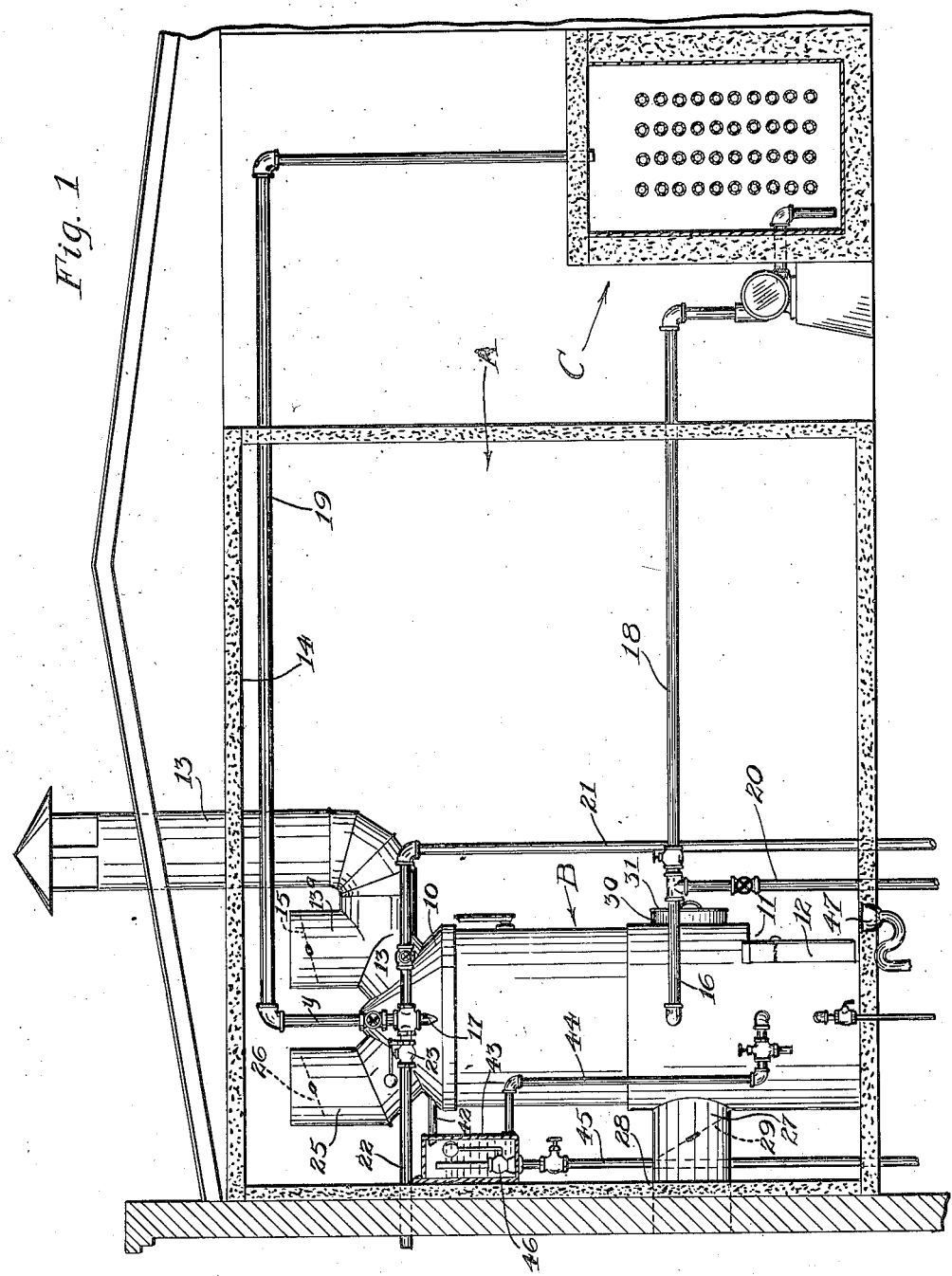

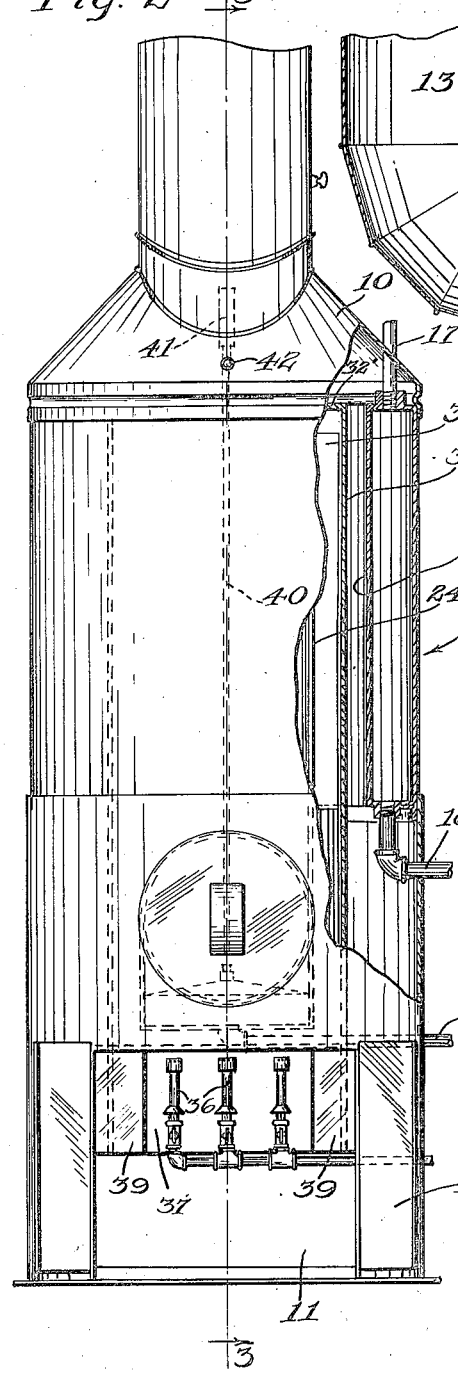

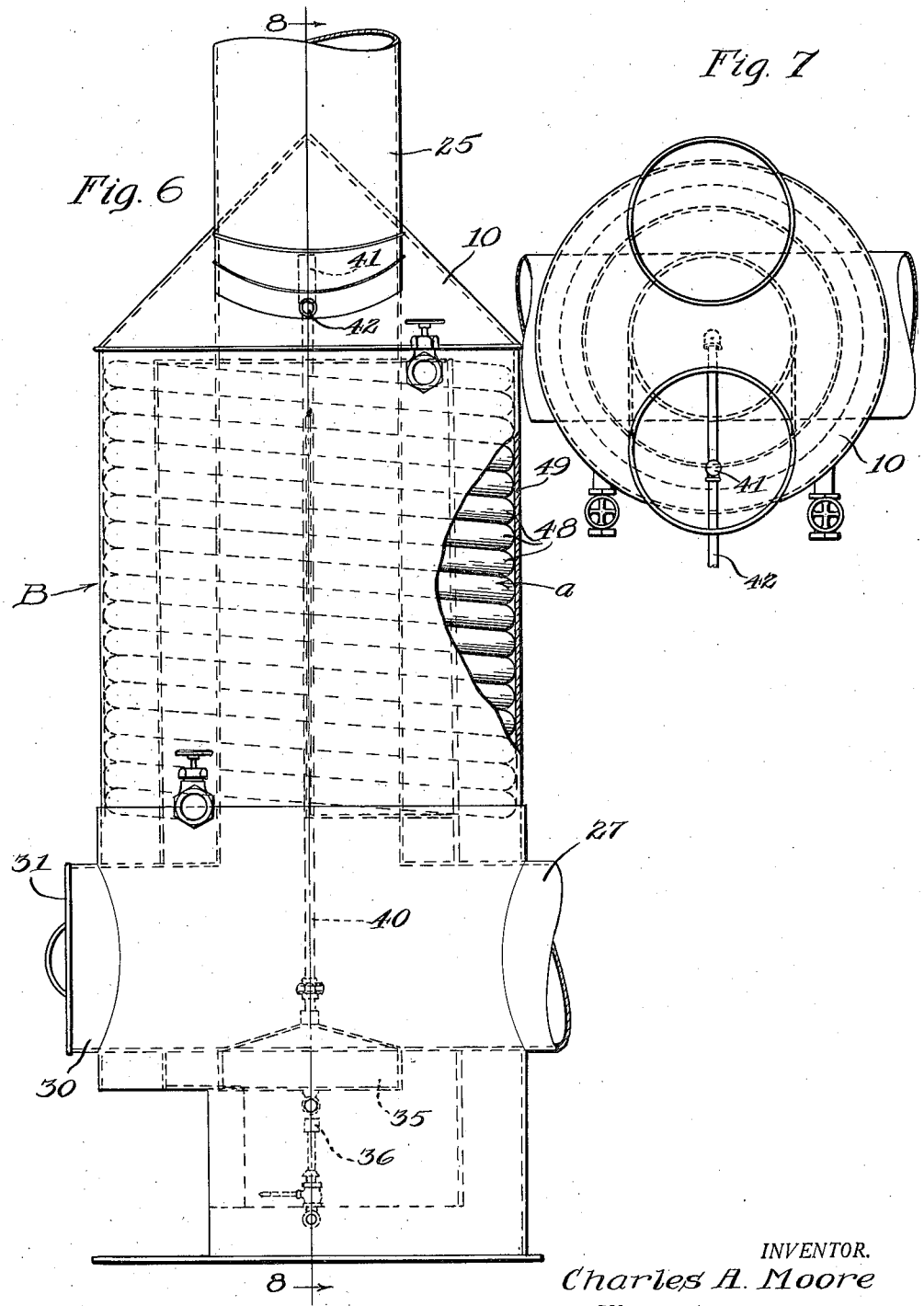

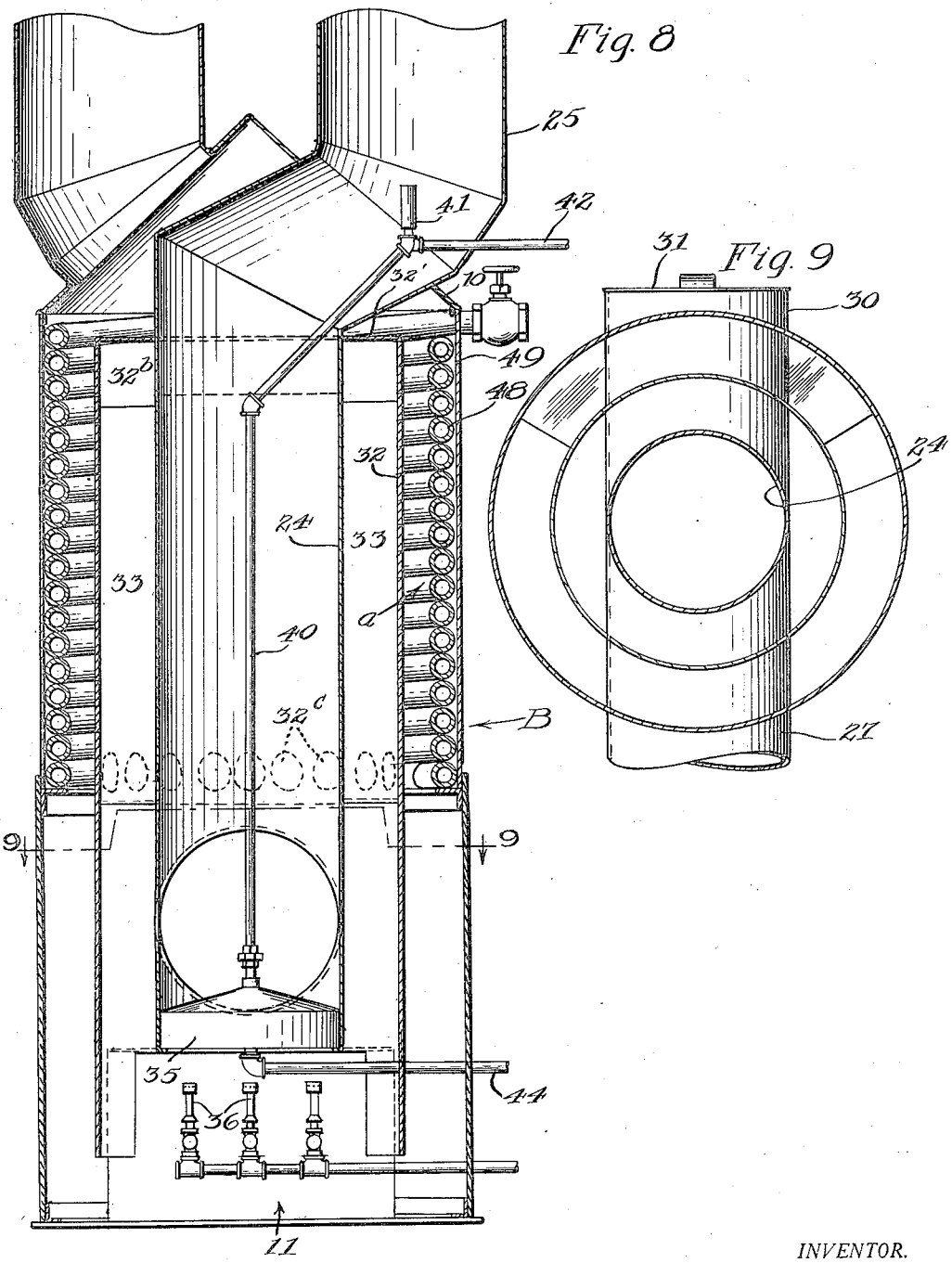

1,769,155

UNITED STATES PATENT OFFICE

CHARLES A. MOORE, OF EDINA, MINNESOTA

ATMOSPHERIC CONDITIONING APPARATUS FOR STORAGE ROOMS

Application filed August 11, 1923, Serial No. 656,815. Renewed July 27, 1928.

My invention relates to improvements in atmospheric conditioning apparatus particularly, though not exclusively, for storage rooms.

The universally growing need for storing widely varied produce under conditions that are sanitary and that provide the requisite temperatures and percentages of humidity under varying outer atmospheric conditions, necessitates a simple, durable, compact and inexpensive atmospheric conditioner which may be readily installed and easily controlled by the ordinary person.

An object of this invention is to supply a unitary apparatus of this kind adapted to be constructed in stock sizes for installation in storage rooms of different dimensions.

A further object is to provide a multi-purpose apparatus of the present nature adapted to provide for ventilation, ventilation accompanied with humidification or dehumidification, ventilated heating accompanied with humidification or dehumidification and ventilated, dehumidified refrigeration.

With the foregoing and other objects in view, which will appear in the following description, the invention resides in the novel combination and arrangement of parts and in the details of construction hereinafter described and claimed.

Figure 4:
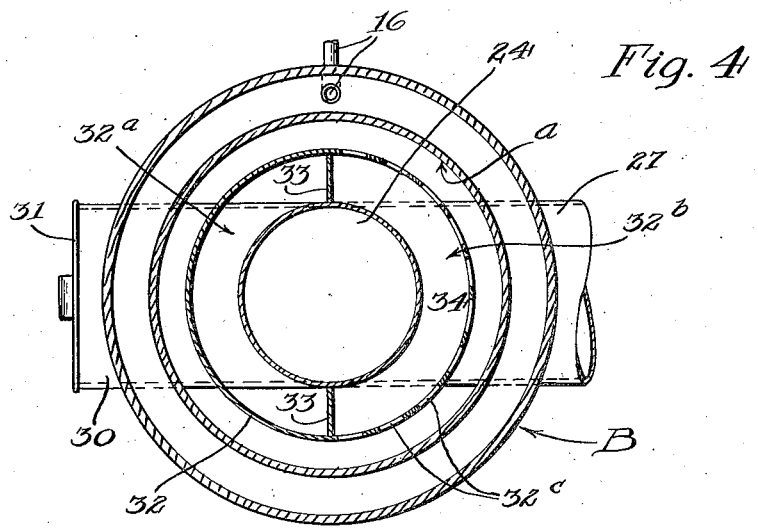
Figure 5:
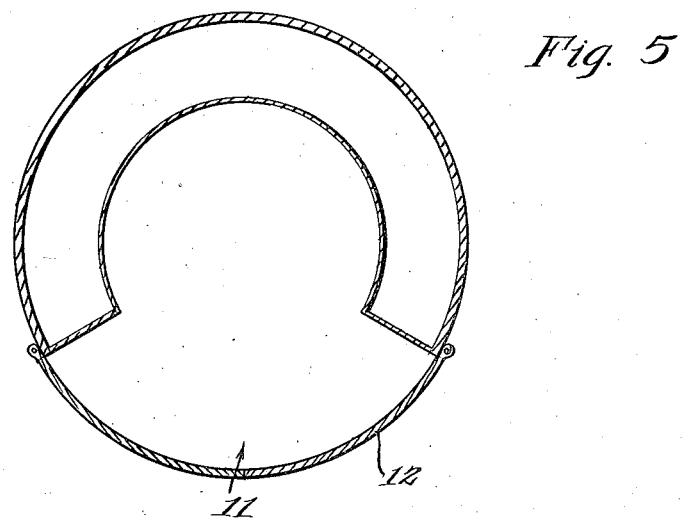

In the drawings, Fig. 1 is a side elevation of an apparatus embodying my invention, the same being shown installed in a room and connected with various fittings; Fig. 2 is a front view of the apparatus, portions thereof being broken away to disclose interior portions; Fig. 3 is a vertical sectional view taken on the line 3—3 of Fig. 2; Fig. 4 is a horizontal sectional view taken as on the line 4—4 of Fig. 3; Fig. 5 is a detail view similar to Fig. 4, the same being taken as on the line 5—5 of Fig. 3; Fig. 6 is an elevational view illustrating an alternate form of my improved apparatus; Fig. 7 is a plan view of the same; Fig. 8 is a vertical central sectional view taken as on the line 8—8 of Fig. 6 and Fig. 9 is a horizontal sectional view taken as on the line 9—9 of Fig. 8.

Referring to the drawings, Fig. 1 illustrates a building equipped with my apparatus and associated fittings for conditioning the atmosphere in a room A. The apparatus includes an upright casing B supplied with a cap 10 and with a doorway 11 at the lower end thereof, said doorway being adapted to be closed by means of doors 12 hinged on said casing. A pipe 13 reaching upward from the cap 10 and through the roof of the building brings the interior of the casing B into communication with the outer atmosphere, said pipe being fitted with a branch pipe 13ª opening near the ceiling 14 of the room and supplied with a damper 15. A jacket $a$ arranged inside of the casing B, is provided to receive a temperature affecting fluid. A pipe 16 opening into the bottom of the jacket $a$ conducts the desired fluid thereto and the pipe 17 at the top of said jacket conveys said fluid therefrom. A brine cooling device C, illustrated in Fig. 1, circulates brine through the casing B, a valved feed pipe 18 being connected with the pipe 16 and a valved return pipe 19 joined with the pipe 17. Cold water, hot water or steam from a valved feed pipe 20 may be circulated through the casing B, a valved pipe 21 being supplied to return the fluids. To prevent injury to the jacket B, under excessive pressures, an overflow pipe 22 fitted with a safety relief valve 23 is provided. This overflow pipe 22 and the two return pipes 19 and 21 are all connected with the branch pipe 17 issuing from said jacket $a$. An upright conduit 24 is arranged axially of the casing B. A pipe 25, leading from the upper end of said conduit extends through the cap 10 and terminates at a point near the ceiling of the room A, said pipe being fitted with a damper 26. Leading horizontally from the lower end of the conduti 24 is a pipe 27, which reaches through the side of the casing B and the wall 28 of the room into the outer atmosphere, said pipe being fitted with a damper 29 operable from within the room. A pipe 30 opposed to said pipe 27 communicates with the conduit 24 and reaches through the front of the casing B. This pipe 30, normally closed by means of a removable cover 31, permits of access to the conduit 24 from inside the room. A drum 32, encircling the conduit 24, is closed at its upper end by a cover plate 32' and opens at its lower end near the bottom of the casing B, the inner and outer walls of said drum being respectively spaced apart from the outer wall of the conduit 24 and the inner wall of the casing B. Opposed upright partitions or baffles 33 between the conduit 24 and drum 32 stop short of the plate 32' at their upper ends and meet at their lower ends with the ends of a horizontal, segmental partition 34 between said conduit and drum. Supported at the lower end of the conduit 24 is a vapor generating tank 35 and beneath said tank are burners 36 for heating both conduit and tank. These burners rest above the lower end of the drum 32, access thereto being had through the doorway 12 in the casing B and through an adjacent opening 37 cut in the side of said drum. Crown and side plates 38 and 39 span the spaces between the upper and side margins of the opening 37 in the drum 32 and the corresponding margins of the doorway 11 in the casing B. Heated air and gases rising from the burners 36 pass through the up-draft passageway 32$^a$ within the drum 32, thence downward through the communicating down-draft passageway 32$^b$ therein. Ports 32$^c$ in the wall of the drum 32, slightly above the segmental partition 34, provide for the escape of heated air and gases from said down-draft passageway 32$^b$ to the interior of the casing B. Within the conduit 24 and leading upward from the tank 35 is a pipe 40 (Fig. 3), the same being supplied at the top thereof with an expansion tube 41 open at its upper end and with an overflow branch pipe 42 reaching outward through the appliance. This branch pipe 42 empties into the top of an elevated water supply tank 43 (Fig. 1), a feed pipe 44 from said supply tank being led downward, thence through the casing B and drum 32 to the vapor generating tank 35. Water from a main 45 opening into the supply tank 43 is admitted to said tank under control of a float actuated valve 46. This valve insures a full generating tank at all times and maintains a constant level in the pipe 40 in near proximity to the elevation of the overflow branch pipe 42.

Under varying pressures and temperatures, the apparatus sets up a ventilating circulation in the room without using the burners 36 or a temperature affecting medium in the jacket $a$. Under some conditions, fresh air enters the pipe 27, passes upward through the conduit 24 and out of the pipe 25 into the room near the ceiling, while air from the floor of the room enters the casing B through the doorway 11 and passes into the outer atmosphere through the casing B. Under other conditions this movement of air may be reversed, the ingress of fresh air being downward through the casing B to the floor of the room and the egress of air downward from the ceiling of the room through the conduit 24. With varying temperatures within and without the room, the attendant differing temperatures in the conduit 24 and casing B result in a stimulated egress of air from the room. In this connection, assume that warm air is rising into the room through the conduit 24, it will be understood that the colder air in the casing B will absorb heat from the conduit 24 and thus warmed will rise through the casing and out of the pipe 13. With cold air descending into the room through the casing B, the warmer air in the conduit 24 will be cooled and thus effected will pass into the outer atmosphere.

Ventilated heating is brought about by introducing hot water or steam to the jacket $a$, as through the feed and return pipes 20, 21, Fig. 1. Under such circumstances the air in the room about the casing B is heated by radiation from the jacket $a$. The column of air within the casing B and about the conduit 24 is heated, its egress from the room being stimulated thereby. The freshening air supply rising in the conduit 24 is heated by the warm air around said conduit, its ingress being stimulated by reason thereof.

Added to the features of combined heating and ventilating is the additional feature of humidification. Lighting the burners 36 results in the generation of vapor in the tank 35 and distribution of the vapor to the freshening air supply entering the room through the conduit 24. The use of said burners also heats the incoming air and aids in stimulating conveying circulation in the apparatus and convective circulation in the room. This will be readily understood when it is noted that the flame from the burners plays against the bottom of the tank 35, which forms the bottom of the conduit 24 and that heated air and gases from said burners travel through the up-draft and down-draft passageways 32$^a$, 32$^b$ of the drum 32 and about said conduit before being admitted to the egress passageway in the casing B. Said burners 36 may be adjusted in the usual manner to supply humidity in varying percentages. With the ability to thus heat at varying temperatures and to charge the atmosphere in the room with humidity in desired percentages, many of the storage problems are met. For example, bananas and other fruits may be matured as required in the presence of heated humidified freshening air. Even without the jacket $a$ as a heating device, the heat from the burners 36 stimulates circulation and heats the freshening air to a limited degree in addition to generating vapor. With the use of said burners alone, it, therefore, will be understood that vegetables and other perishable products in a room can be protected against mildly cold weather and saved from deterioration and shrinkage as well.

Should the air in a room become too highly charged with moisture through the use of the burners 36 or during simple ventilation, the damper 15 in the branch pipe 13ª may be opened, partially or fully, and the doors 12 on the casing B correspondingly adjusted, whereupon the upper stratum of air, which contains the highest percentage of humidity, will be skimmed from the room by said branch pipe 13ª and led therethrough to the egress pipe 13. This dehumidifying process may also be carried out under ventilated refrigeration, which now will be described.

In refrigerating, chilled water or brine is introduced to the jacket a, as through the feed and return pipes 18, 19 or 20, 21. The freshening air within the casing B and about the conduit 24 settles upon being cooled and flows into the room through the doorway 11 in said casing. Being cooled owing to the near proximity of the refrigerant, the egress of air from the room through the conduit 24 is stimulated. Condensation of moisture on the inner wall of the jacket a, during refrigeration, and the disposition of drip from said wall through a floor drain 47 results in dehumidifying the freshening air. This result is advantageous since it is desirous to have a low percentage of humidity in a refrigerating atmosphere. Aiding, if desired, in the dehumidifying process, the pipe 13ª operates to skim the air most heavily laden with moisture from the stratum near the ceiling of the room.

Refrigeration like heating may be controlled by regulating the temperature and circulation of the temperature effecting medium in the jacket a. This regulation coupled with the regulation of the dampers 15, 26 and 29 and of the doors 12 brings about any desired atmospheric condition within a storage room under varying climatic conditions outside.

In the alternate form of apparatus illustrated in Figs. 6—9, the jacket a for the casing B comprises a coiled pipe 48. Weight, cost and pressure withstanding qualities considered, it will be understood that a jacket of coiled pipe as at 48 is desirable over the plain drum-like jacket a (Figs. 2 and 3) under conditions where pressures within the jacket are great.

From the above explanation, it will be understood that the apparatus will serve to ventilate a room; that it will increase or reduce the temperature of the freshening air and at the same time establish stimulated conveying circulation within the apparatus resulting in stimulated convective and diffused circulation within the room and that it will increase or reduce the percentage of humidity in a room under varying conditions to suit differing requirements.

Changes in the specific form of my invention, as herein disclosed, may be made within the scope of what is claimed without departing from the spirit of my invention.

Having described my invention, what I claim as new and desire to protect by Letters Patent is:

1. An atmospheric conditioning apparatus for use in a room comprising an upright jacketed casing adapted to receive in the jacket thereof a heating medium, said casing communicating at the lower end thereof with the lower portion of the room and at its upper end with the outside atmosphere, a vertical conduit extending centrally within and spaced apart from the casing, said conduit communicating at its upper end with the upper portion of the room, and at its lower end with the outer atmosphere, a drum around the conduit and spaced apart from said casing and said conduit, and said drum communicating at its lower end with the lower portion of the room, a vapor tank opening into the conduit, a means to heat the tank and drum, said drum having an outlet into the casing for heated air and gases from said heating means.

2. An atmospheric conditioning apparatus for use in a room comprising an upright casing communicating at its lower end with the lower portion of the room and at its upper end with the outer atmosphere, a conduit extending axially within and spaced apart from the casing, said conduit communicating at its upper end with the room near the ceiling and at its lower end with the outer atmosphere, a drum encircling the conduit and spaced apart from said casing, said drum communicating at its lower end through said casing with the lower portion of the room, heating means beneath the drum, baffles interposed between the drum and conduit and dividing the interior of the drum into an up-draft section for heated air and gases from said heating means and a communicating down-draft section, said drum having an outlet at the lower portion of said latter section opening into the passageway between said drum and casing.

3. An atmospheric conditioning apparatus for use in a room comprising an upright casing communicating at its lower end with the lower portion of the room and at its upper end with the outside atmosphere, a conduit extending axially within and spaced apart from the casing, said conduit communicating at its upper end with the room near the ceiling and at its lower end with the outer atmosphere, a drum encircling the conduit and spaced apart from the casing, said drum communicating at its lower end through said casing with the lower portion of the room, a vapor generator opening into the conduit, means for heating said drum and generator, and baffles interposed between the drum and conduit and dividing the interior of the drum into an up-draft section for heated air and gases from said heating means and a communicating down-draft section, said drum having an outlet at the lower portion of said latter section opening into the passageway between said drum and casing.

4. An atmospheric conditioning apparatus for use in a room comprising an upright casing communicating at its lower end with the lower portion of the room and at its upper end with the outside atmosphere, a conduit extending axially within and spaced apart from the casing, said conduit communicating at its upper end with the room near the ceiling and at its lower end with the outer atmosphere, a drum encircling the conduit and spaced apart from said casing, said drum communicating at its lower end through said casing with the lower portion of the room, and heating means beneath the drum, said drum having an outlet into the casing for heated air and gases from said heating means.

5. An atmospheric conditioning apparatus for use in a room comprising an upright casing, a jacket incorporated in said casing adapted to receive a heating medium, said casing being open near the bottom thereof into the room near the floor, a pipe leading upward from the top of said casing and open to the outside atmosphere, a vertical conduit extending centrally of and spaced apart from the casing, a pipe leading upwardly from the conduit through the top of the casing and terminating near the ceiling of the room, a pipe leading horizontally into the room from the outer atmosphere and connecting with the conduit at the lower end thereof, a drum encasing the conduit and spaced apart from said casing, said drum communicating at its lower end with the lower portion of the room through said casing, a vapor tank opening into the conduit, means to heat the tank and drum, and baffle plates interposed between the drum and conduit and dividing the former into an up-draft section for heated air and gases from the said heating means and a communicating down-draft section, said drum having ports at the lower portion of said down-draft section opening into the passageway between said drum and casing.

6. An atmospheric conditioning apparatus for use in a room comprising an upright casing communicating at its lower end with the lower portion of the room and at its upper end with the outside atmosphere, means for heating the casing, a conduit extending axially within and spaced apart from the casing, said conduit communicating at its upper end with the room near the ceiling and at its lower end with the outer atmosphere, a vapor generator opening into said conduit, and means independent of said first heating means for heating the conduit and also the generator.

7. An atmospheric conditioning apparatus for use in a room comprising an upright casing communicating at its lower end with the lower portion of the room and at its upper end with the outside atmosphere, means for heating the casing, a conduit extending axially within and spaced apart from the casing, said conduit communicating at its upper end with the room near the ceiling and at its lower end with the outer atmosphere, and means for heating the conduit.

8. An atmospheric conditioning apparatus for use in a room comprising a duct leading downwardly into the lower portion of the room from outside, said duct having an opening near the ceiling and a second opening near the floor, a jacket for a temperature affecting medium associated with said duct between said openings, a second duct leading downward from the upper portion of the room to outside, and adjustable closures for the openings in said first duct.

9. An atmospheric conditioning apparatus for use in a room comprising a duct communicating with the outer atmosphere above the room, said duct having an opening near the ceiling and another opening near the floor, a second duct communicating with the room near the ceiling and with the outer atmosphere near the level of the floor, said ducts being arranged one within the other to effect in one a stimulated circulation by reason of differences in temperature in the other, and adjustable closures for said openings in the first duct, said closures providing for the regulated ingress and egress of air to and from said first duct at the ceiling and floor of the room.

10. An atmospheric conditioning apparatus for use in a room comprising a duct leading downwardly into and communicating with the lower portion of the room from outside, a second duct communicating with and leading downward from the upper portion of the room to outside, a portion of one duct being encased within the other and temperature affecting means associated with one of said ducts, said means being convertible for heating and refrigerating purposes.

11. An apparatus of the class described for use in a room constituting room ventilating passageways, each adapted both for ingress and egress of air, one passageway including an upright casing communicating at its upper end with the outer atmosphere and at its lower end with the room near the floor, the other passageway including a conduit within said casing communicating at its upper end with the room near the ceiling and at its lower end with the outer atmosphere, and a jacket for a temperature affecting medium associated with said casing.

12. A conditioning apparatus for use in a room comprising a duct leading downwardly into the lower portion of the room from outside, a second duct leading downward from the upper portion of the room to outside, a portion of one duct being encased within the other, and independent temperature affecting means associated with each duct.

13. A conditioning apparatus for use in a room comprising a duct leading downwardly into and communicating with the lower portion of the room from outside, a second duct communicating with and leading downward from the upper portion of the room to out side, a portion of one duct being encased within the other and temperature reducing means associated with one of said ducts.

14. An atmospheric conditioning apparatus for use in a room comprising a duct leading downwardly into and communicating with the lower portion of the room from outside, a second duct communicating with and leading downward from the upper portion of the room to the outside, a portion of one duct being encased within the other and a jacket for a temperature affecting medium associated with one of said ducts.

15. An apparatus for use in a room, comprising a duct leading downwardly into and communicating with the lower portion of the room from the outside, said duct being in communication at its upper portion with the upper portion of the room, and a duct for heated air and gases communicating with said first duct between the levels of communication thereof with the upper and lower portions of the room.

In testimony whereof, I have signed my name to this specification.

CHARLES A. MOORE.